United States Patent [19]

Miura et al.

[11] Patent Number: 4,801,955

[45] Date of Patent: Jan. 31, 1989

[54] INK JET PRINTER

[75] Inventors: Masayoshi Miura; Kenji Akami, both of Kawasaki; Gen Oda, Sagamihara; Tamotsu Kojima, Kawasaki; Hiroshi Naito, Machida, all of Japan

[73] Assignee: Matsushita Electric Industrial Co., Ltd., Japan

[21] Appl. No.: 74,306

[22] Filed: Jul. 15, 1987

Related U.S. Application Data

[60] Division of Ser. No. 781,058, Sep. 27, 1985, Pat. No. 4,728,392, which is a continuation-in-part of Ser. No. 725,354, Apr. 19, 1985, abandoned.

[30] Foreign Application Priority Data

| | | | |
|---|---|---|---|
| Apr. 20, 1984 | [JP] | Japan | 59-80419 |
| Apr. 27, 1984 | [JP] | Japan | 59-86418 |
| May 8, 1984 | [JP] | Japan | 59-92249 |
| Jul. 27, 1984 | [JP] | Japan | 59-157823 |
| Jul. 27, 1984 | [JP] | Japan | 59-157828 |
| Jul. 27, 1984 | [JP] | Japan | 59-157812 |
| Aug. 29, 1984 | [JP] | Japan | 59-179820 |
| Sep. 12, 1984 | [JP] | Japan | 59-191010 |
| Sep. 28, 1984 | [JP] | Japan | 59-203406 |
| Jul. 23, 1985 | [JP] | Japan | 60-162403 |
| Aug. 13, 1985 | [JP] | Japan | 60-177911 |
| Sep. 5, 1985 | [JP] | Japan | 60-196290 |

[51] Int. Cl.⁴ ............ G01D 15/18

[52] U.S. Cl. ............ 346/140 R

[58] Field of Search ............ 346/140, 75

[56] References Cited

U.S. PATENT DOCUMENTS

| | | | |
|---|---|---|---|
| 3,887,928 | 6/1975 | Ohno | 346/140 |
| 4,002,230 | 1/1977 | Schweppe | 346/75 X |
| 4,059,480 | 11/1977 | Ruh et al. | 156/644 |
| 4,066,491 | 1/1978 | Ruh et al. | 156/644 |
| 4,276,335 | 6/1981 | Lemmond | 428/131 |
| 4,296,421 | 10/1981 | Hara | 346/140 |
| 4,403,234 | 9/1983 | Miura et al. | 346/140 |
| 4,413,268 | 11/1983 | Bentin | 346/140 |
| 4,549,188 | 10/1985 | Shackleton | 346/75 X |
| 4,555,717 | 11/1985 | Miura | 346/140 |

FOREIGN PATENT DOCUMENTS

| | | |
|---|---|---|
| 0054999 | 6/1982 | European Pat. Off. . |
| 56-130365 | 10/1981 | Japan . |
| 59-192576 | 10/1984 | Japan . |
| 59-192577 | 10/1984 | Japan . |

OTHER PUBLICATIONS

IBM Technical Disclosure Bulletin, vol. 26, No. 3A, Aug. 1983, p. 1041, Armonk, New York, US; G. J. Ratchford: "Nozzle Plate".

Patents Abstracts of Japan, vol. 9, No. 57 (M-363) (1780), 13th Mar., 1985; & JP-A-59 192 576 (Matsushita Denki Sangyo K.S.) 31-10-1984.

Hildenbrand et al; Preventing clogging of small orifices in objects being coated, IBM TDB, vol. 15, No. 9, Feb. 1973, p. 2899.

*Primary Examiner*—Joseph W. Hartary

*Attorney, Agent, or Firm*—Lowe, Price, Leblanc, Becker & Shur

[57] ABSTRACT

An ink jet printer having a print head which comprises a front nozzle member having a front channel, a housing secured to the front nozzle member, and a rear nozzle member which defines with the housing a liquid chamber and further defines with the front nozzle member a laminar airflow chamber. The rear nozzle member has a forwardly projecting nozzle and a rear channel extending from the liquid chamber through the projecting nozzle in axial alignment with the front channel to form a meniscus at the front end. An electric field gradient is established between the front channel and the meniscus to cause the latter to extend toward the front channel and expelled through the front channel. A portion of the front nozzle member is rendered liquid-repellant to prevent the field distribution from being seriously disturbed by an ink layer formed on it by stray liquid particles.

1 Claim, 9 Drawing Sheets

INK JET PRINTER

This is a division of application Ser. No. 781,058, filed 9/27/85, now U.S. Pat. No. 4,728,392, which is a continuation-in-part application of U.S. patent application Ser. No. 725,354 filed Apr. 19, 1985 now abandoned.

BACKGROUND OF THE INVENTION

The present invention relates generally to ink jet printers, and more specifically to an ink jet print head of the type wherein liquid is discharged through axially aligned rear and front channels under the combined effects of electric field and air pressure gradients and a method for fabricating a rear nozzle member in which the rear channel is provided.

An ink jet print head of the type as shown and described in U.S. Pat. No. 4,403,234 comprises a front nozzle member secured to a housing to define a laminar airflow chamber. The housing is formed with a rear channel axially aligned with a front channel provided in the front nozzle member. The rear channel is connected by an electrically conductive pipe to a liquid supply to create a meniscus at the exit end of the rear channel. The conductive pipe is connected to a signal source to charge the liquid in the rear channel with respect to the front channel so that an electric field gradient is established between the meniscus and the front channel. The airflow chamber is connected to a pressurized air supply to produce an air pressure gradient between the exit ends of the rear and front channels. Owing to the combined effects of the field and pressure gradients, the meniscus is pulled forward and ejected through the front channel to a writing surface.

However, the meniscus is very sensitive to disturbance generated when the print head scans across the writing surface and becomes unstable when it returns to the original shape after ejection of a droplet.

SUMMARY OF THE INVENTION

It is therefore an object of the present invention to provide an ink jet printer of the electro-pneumatic type in which the meniscus at the rear channel has a high degree of stability against both vibrations and transients and to provide a method for fabricating a rear nozzle plate in which the rear channel is provided.

The ink jet printer of the invention comprises a source of pressurized air, a liquid container and an ink jet print head. The print head comprises a front nozzle member having a front channel, a housing secured to the front nozzle member, and a rear nozzle member which defines with the housing a liquid chamber connected to the liquid container and further defines with the front nozzle member a laminar airflow chamber.

According to the invention, the rear nozzle member is provided with a forwardly projecting nozzle and a rear channel extending from the liquid chamber through the projecting nozzle in axial alignment with the front channel to form a meniscus at the front end. The projecting nozzle substantially corresponds in radial dimensions to the front channel. The airflow chamber is connected to the air source for directing air to a point between the front and rear channels so that it makes a sharp turn at the entry into the front channel creating a sharp pressure gradient along a path between the exit ends of the front and rear channels. Due to the presence of the projecting nozzle in the airflow chamber, a dead air region is produced in a location adjacent the exit end of the rear channel. An electric field gradient is established between the front channel and the meniscus to cause the latter to extend to and partially expelled outwards through the front channel. The liquid container is connected to the air source so that in the absence of the electric field gradient the liquid pressure in the rear channel is statically balanced with the combined forces of air pressure acting on the meniscus and the surface tension of the liquid.

The formation of the dead air region causes the meniscus to convex, producing a high concentration of electric field and reducing the minimum voltage required to tear it apart into a droplet.

According to a second aspect of the present invention, a method for fabricating a nozzle plate of an ink jet print head is provided. The method comprises the steps of etching a substrate according to a first pattern from a first surface thereof to a predetermined depth to form a projecting nozzle having a nozzle opening therein, and etching the substrate according to a second pattern from a second, opposite surface thereof to form a bore extending to and aligned with the nozzle opening. The two-step etching process is advantageous in reducing the time taken to produce the projecting nozzle since it minimizes deviations in nozzle-opening size which might occur as a result of the tendency of the substrate material to erode sideways between different nozzles which are simultaneously produced on a single substrate. Furthermore, the bore at the rear of the nozzle opening can be appropriately dimensioned so that its transverse cross-section is larger than than that of the nozzle opening and hence to reduce the resistance it offers to liquid passing therethrough.

According to a further feature of the invention, a surface portion of the front nozzle member adjacent its channel is rendered ink-repellant to prevent the electric field distribution from being seriously disturbed by an ink layer formed on it by stray ink particles.

BRIEF DESCRIPTION OF THE DRAWINGS

The present invention will be described in further detail with reference to the accompanying drawings, in which.

DETAILED DESCRIPTION

Figure 1:
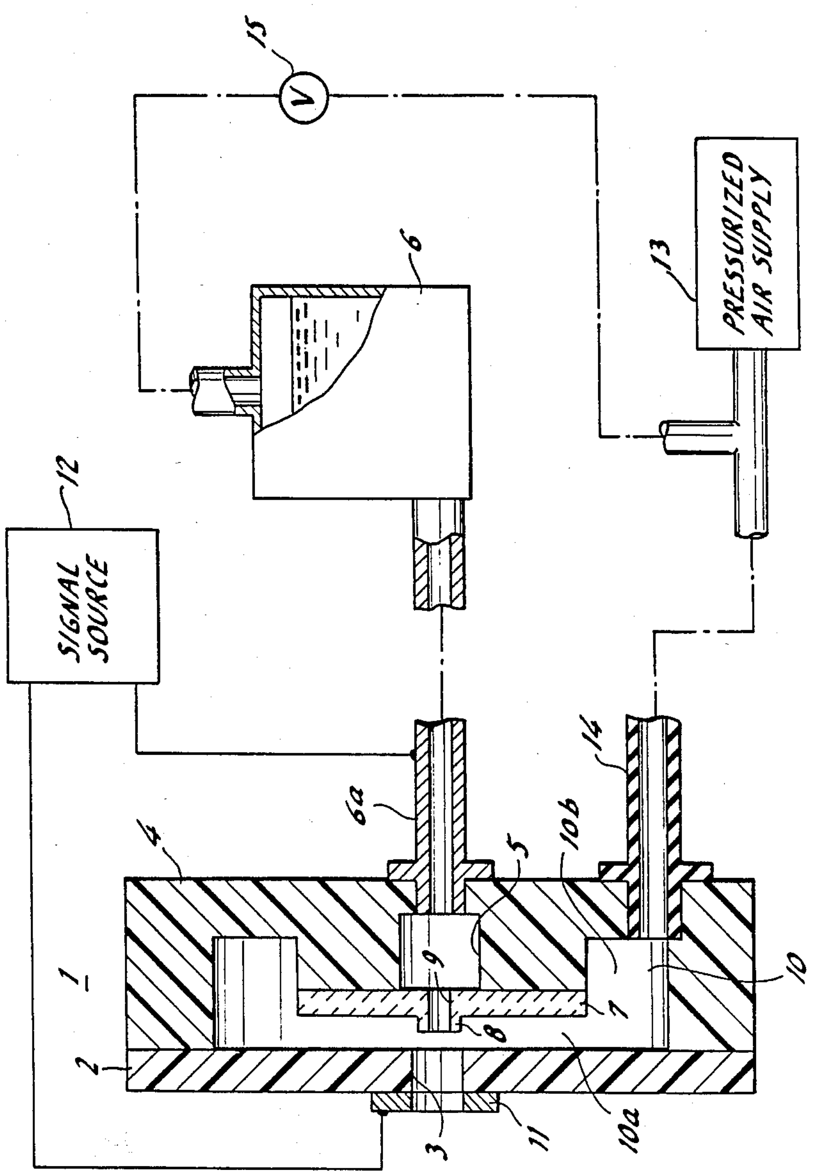
FIG. 1 is a block diagram of an ink jet printer incorporating a print head of the present invention.

Referring now to FIG. 1, there is shown an ink jet print head and its associated devices according to a preferred embodiment of the invention. The print head 1 comprises a front nozzle panel 2 having a front channel 3. The front nozzle plate 2 is formed of insulative material and secured to a rear housing 4 of insulative material. The rear housing is formed with a liquid chamber 5 to hold ink therein supplied from an ink container 6 through electrically conductive pipe 6*a*. The liquid chamber 5 is defined at the front with a rear nozzle plate 7 having a projecting nozzle 8. A rear channel 9 extends from the liquid chamber 5 through the projecting nozzle 8 in axial alignment with the front channel 3 to allow ink in liquid chamber 5 to lead therethrough to form a meniscus at the extreme end. Front nozzle plate 2 defines with rear nozzle plate 7 a disc-like, laminar airflow chamber 10*a* of an air chamber 10 and defines with rear housing 4 an annular portion 10*b*.

A ring electrode 11 encircling the front channel 3 is secured to the outer surface of front nozzle plate 2. A voltage is applied across electrode 11 and pipe 6*a* from a signal source 12 to establish an electric field gradient between electrode 11 and the liquid in rear channel 9.

A pressurized air supply source 13 is connected by a pipe 14 to the air chamber 10 to generate an airflow in the annular air chamber portion 10*b* to cause it to spiral in a laminar flow through the disk-like chamber portion 10*a* to front channel 3 and thence to the outside. The airstream makes a sharp turn at the entry to front channel 3 creating a sharp pressure gradient along a path between the front ends of rear channel 9 and front channel 3. Pressurized air is also supplied through a regulator valve 15 to the ink container 6. Valve 15 is adjusted so that in the absence of a voltage on electrode 11 the liquid pressure in rear channel 9 is statically balanced with the combined forces of air pressure acting on the meniscus and its surface tension. In response to the application of a voltage to electrode 11, the liquid in rear channel 9 is electrostatically charged and pulled forward under the influence of electric field gradient. The liquid is elongated into a pencil-like shape under the pressure of air ejected through the front channel 3 and ejected to a writing surface.

Figure 2:
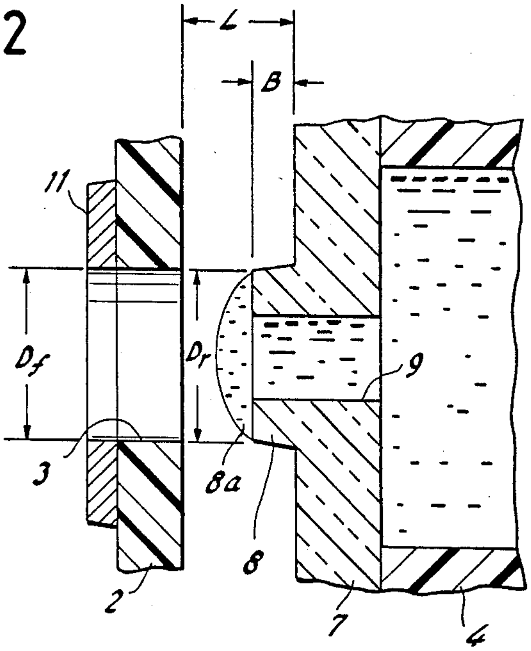
FIG. 2 is an illustration of details of a portion of the print head of FIG. 1.

As best seen in FIG. 2, the projecting nozzle 8 has an outer diameter slightly smaller than the diameter of front channel 3 and extends forward from the nozzle plate 7 by a distance B. Airstream is narrowed as it passes through the space between the front and rear channels and creates a dead air region immediately adjacent the front end of rear channel 9. On the other hand, the liquid in rear channel 9 wets the front surface of the nozzle 8 and tends to disperse outward. However, further dispersion of the liquid beyond the outer edge of rear nozzle 8 is prevented by a force exerted thereupon by the airstream moving past that outer edge, causing the liquid to slightly bulge forward. In the absence of electric field, the high pressure in the dead air region causes the meniscus at the front end of rear channel 9 to assume a convexed shape as shown at 8*a* and stabilizes it against external disturbance.

Figure 3:
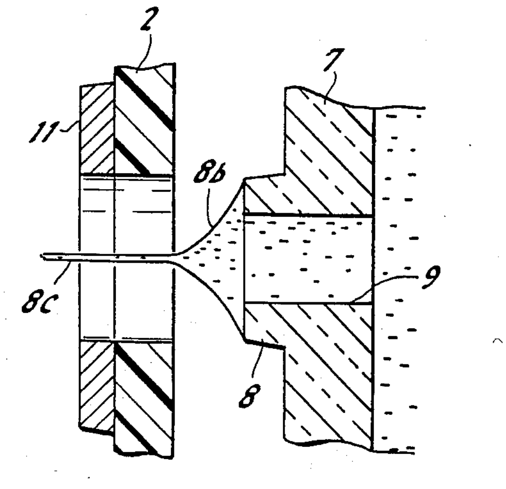
FIG. 3 is an illustration useful for describing the advantageous effect of the projecting nozzle of the invention.

When the ring electrode 11 is impressed with a voltage, the meniscus is elongated rapidly, forming a slope portion 8*b* extending from the outer edge of rear nozzle 8 to a narrow, pencil-like portion 8*c*, as shown at FIG. 3. The formation of convexed meniscus 8*a* concentrates the electric field thereon and reduces the minimum voltage required to tear it apart into droplets. Because of the presence of the dead air region, the meniscus quickly returns to the original state after ejection of ink.

In a preferred embodiment, the front surface of the nozzle 8 is roughened to present a small angle of wet to liquid to allow the meniscus to easily wet the front surface of nozzle 8. The small wet angle reduces the response time of the print head and increases the amount of liquid to be ejected per unit time.

It is preferable that the axial dimension B of the rear nozzle 8 and the outer diameter Dr of rear nozzle 8 satisfy the following relations:

$$4L > B > L/20$$

$$Df > Dr > Df/4$$

where, L=spacing between front and rear nozzle plates 2 and 7, and Df=diameter of front channel 3.

Experiments confirmed that under like operating factors the print head of the present invention operates with a minimum pulse duration which is 1/10 of the minimum pulse duration of the prior art and is immune to vibrations in a range which is ten times greater than the prior art.

Various preferred forms of the rear nozzle plate are shown in FIGS. 4A to 4F. The variations shown at FIGS. 4A to 4D are advantageous to further increase meniscus stability and improve meniscus response characteristic. This is accomplished by increasing the contact area of the rear nozzle front end face with liquid. In these variations, the rear channel 9 has a front portion passing through nozzle 8 and a rear portion passing through nozzle plate 7.

Figure 4A:
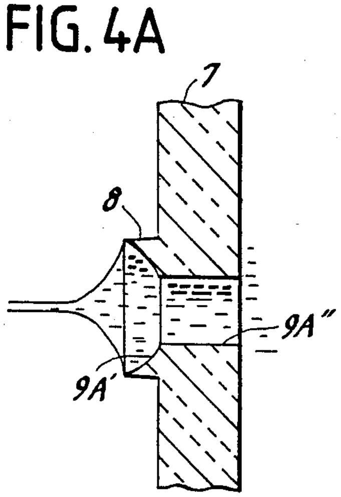
FIGS. 4A to 4F are illustrations of various modifications of the rear nozzle plate.

In FIG. 4A, the rear channel 9 has a front portion 9A' having a part-spherical surface and a cylindrical rear portion 9A". The rear channel 9 in FIG. 4B has a frusto-conically shaped front portion 9B' and a rear portion 9B". In FIG. 4C, rear channel 9 has a front portion 9C' having a larger transverse cross-sectional area than a rear portion 9C". This increases the amount of liquid to be contained in the nozzle 8. The rear channel 9, FIG. 4D, has a front portion 9D' having a staircase cross-section and a cylindrical rear portion 9D", the staircase portion increasing its diameter with distance away from the rear portion 9D".

Figure 4B:
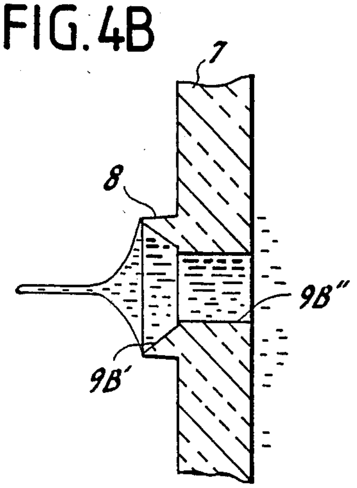
Figure 4C:
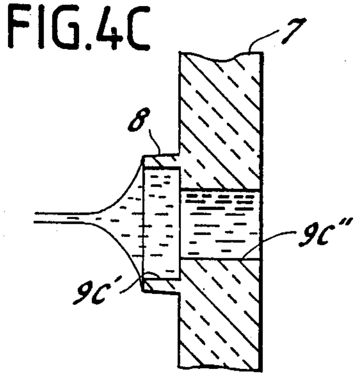
Figure 4D:
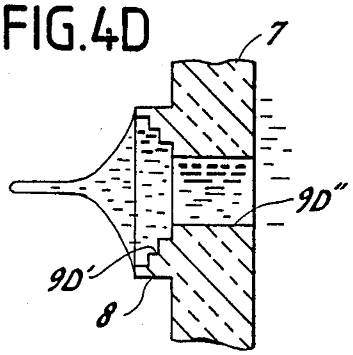

In the embodiments of FIGS. 4A and 4B, the liquid being ejected forms a large angle of wet contact with the surface of the front portions 9A', 9B' as compared with the embodiment of FIG. 1 and is thus given a greater liquid retaining force with which the meniscus is more stabilized against external vibrations which might otherwise cause it to break. In the embodiments of FIGS. 4C and 4D, front portions 9C' and 9D' serve as reservoirs to hold a greater amount of liquid therein to increase liquid ejection capability.

Figure 4E:
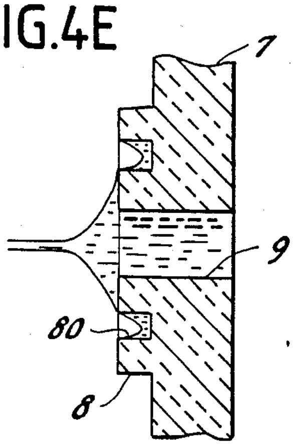
Figure 4F:
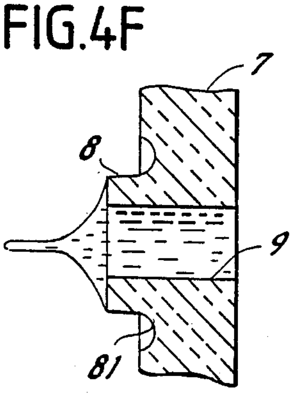

In FIG. 4E, rear nozzle 8 is formed with an annular groove 80 to entrap liquid which might spill over the edge of the nozzle if an excessive amount of force is externally applied to the print head. The annular groove may be provided around the nozzle 8 as shown at 81 in FIG. 4F.

Description will now be given to a method for fabricating a rear nozzle plate with reference to FIGS. 5A to 5G.

Figure 5A:
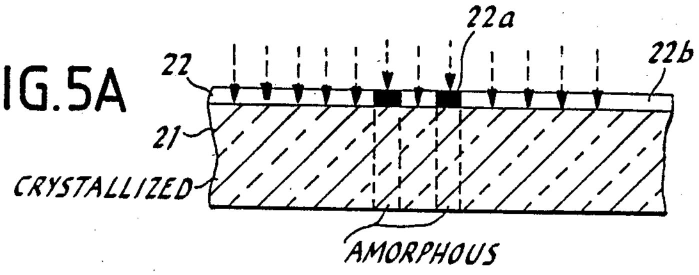
FIGS. 5A to 5G are illustrations of steps for fabricating a rear nozzle plate of the print head according to the invention.

Illustrated at 21 in FIG. 5A is a photosensitive glass which is composed of a $SiO_2$-$Al_2O_3$-$Li_2O$ glass containing $CeO_2$ and $Ag_2O$. A photomask 22 having a plurality of ring-shaped opaque portions 22a (only one of which is shown for simplicity) in a transparent area 22b is placed on the upper surface of the glass 21. The photosensitive glass 21 is subject to an imagewise radiation of ultraviolet light through the mask 22 to cause portions 21b underlying the transparent portion 22b to provide the following reaction:

$$Ce^{3+}+A^{+}+\text{ultraviolet light}—Ce^{4+}+Ag^{0}$$

Figure 5B:
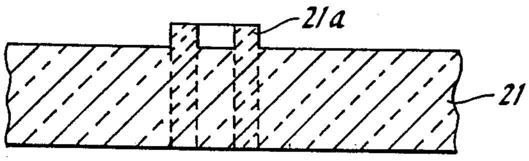

The glass is then subject to a primary heat treatment so that the silver content of the compound becomes colloidal and then subject to a secondary heat treatment to form crystals $Li_2O$-$SiO_2$ around silver colloids. The $Li_2O$-$SiO_2$ crystals are etched away to a predetermined depth. This leaves an upper portion of the amorphous region to serve as a rear nozzle 21a as shown in FIG. 5B. This etching process is preferably accomplished by applying a layer of hydrofluoric acid resistant material to the lower surface of the glass and submerging it into an aqueous hydrofluoric acid solution. Suitable material for the hydrofluoric acid resistant layer is a paraffin-containing material available from Sou Denshi Kogyo Kabushi Kaisha under the trademark of "Electron Wax". The wax is applied at a temperature of 70° C. and removed by immersing it in a trichloroethylene solution agitated at an ultrasonic frequency.

Figure 5C:
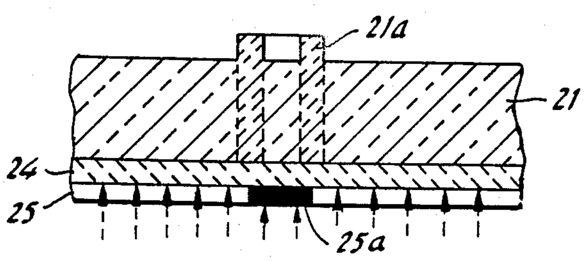

In FIG. 5C, a photoresist layer 24 is coated on the lower surface of the glass 21 and a photomask 25 having a plurality of opaque portions 25a is placed on the photoresist 24 so that opaque portion 25 aligns with corresponding the nozzle 21a. The diameter of the opaque portion 25a is greater than the inner diameter of, but smaller than the outer diameter of, the nozzle 21a. The photoresist is exposed to ultraviolet imagewise radiation through the mask 25. Unexposed portions are etched to form a plurality of holes 24a each being concentrical with the nozzle 21a as shown at FIG. 5D.

Figure 5D:
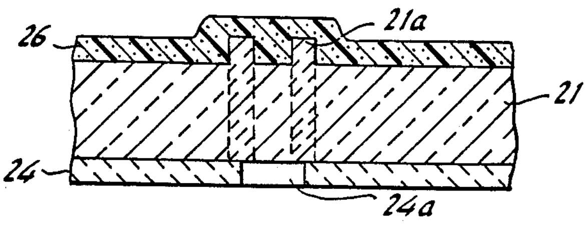
Figure 5E:
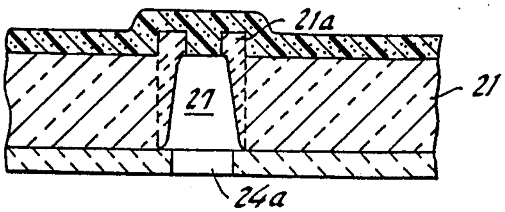
Figure 5F:
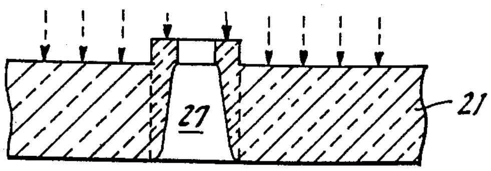
Figure 5G:
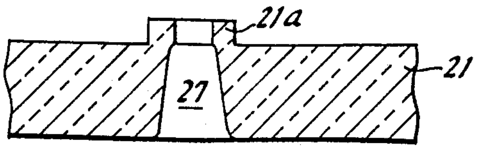

A hydrofluoric acid resistant layer 26 is then formed over the entire upper surface of the glass 21 so that it fills the space within the projecting nozzle 21a as shown in FIG. 5D. The glass substrate is immersed in an aqueous hydrofluoric acid solution to etch the portions of the glass above the hole 24a to thereby produce a bore 27 extending across the thickness of the glass 21. The photoresist 24 is removed after it is carbonized in a plasma and the layer 26 is removed by immersing the glass in a trichloroethylene solution agitated at an ultrasonic frequency (FIG. 5E). Since the nozzle 21a remains amorphous, it is preferable that the glass be flooded with ultraviolet light and heat-treated in a manner similar to that described in connection with the step of FIG. 5A to crystallize the amorphous channel portions 21a. This crystallization process causes the whole glass 21 to homogenize as shown at FIG. 5G and increases its mechanical strength. The glass 21 is then cut into individual nozzle plates.

It is seen that nozzle portion 21a and hole 27 are created by etching the glass in opposite directions. Although the amorphous region of the glass has a tendency to erode at a rate substantially 1/20 of the rate at which the crystalline region erodes, the method of the invention keeps the glass 21 from being subject to a prolonged single etching process and thus prevents it from being excessively eroded sideways. It is possible to produce a rear nozzle plate with a nozzle 21a having an outer diameter of 100 micrometers with an error of ±2 micrometers, an inner diameter (at the forward end) of 40 micrometers with an error of ±2 micrometers and an axial dimension of 35 micrometers. In this case, the hole 27 has a depth of 130 micrometers. Although it has a small thickness in radial directions, the nozzle 21a has a sufficient rigidity to retain its shape for an extended period of time. The glass-formed nozzle plate 7 has another advantage in that it is chemically resistant to ink and free from swelling.

Figure 6:
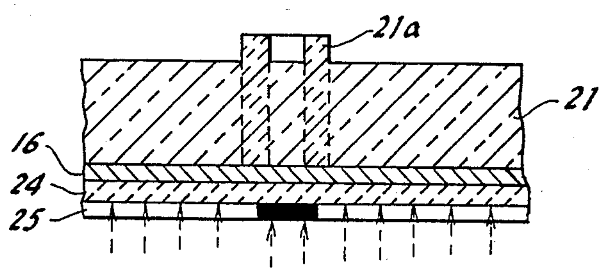
FIG. 6 is an illustration of a modified step of FIG. 5C.
Figure 7A:
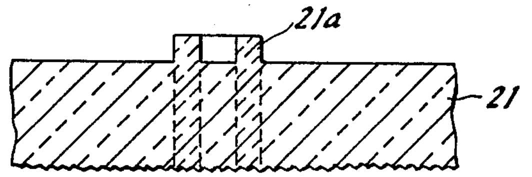
FIGS. 7A and 7B are illustrations of a further modification of FIG. 5C.
Figure 7B:
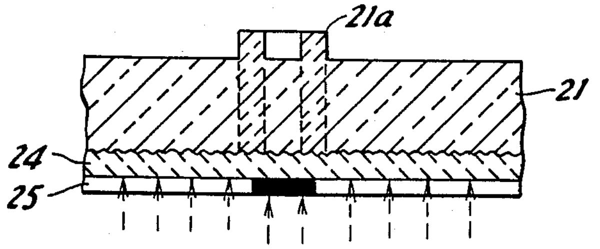

In the process step shown in FIG. 5C, incident ultraviolet light that penetrates the photoresist 24 is reflected irregularly at different depths of the crystallized portions of the glass and part of the reflected light enters undesired portions of the photoresist 24, causing the boundary between the light-exposed and non-exposed areas to blur. For this reason, a light-shielding layer 16 is provided between the lower surface of glass 21 and photoresist 24 as shown in FIG. 6. The light-shielding layer 16 is formed by vacuum-evaporating a hydrofluoric acid resistant material such as gold on the glass until it attains a thickness of 1 to 2 micrometers. After being exposed to ultraviolet imagewise radiation, the photoresist 24 is removed followed by the removal of gold layer 16 using aqua regia. Alternatively, the lower surface of glass 21 is roughened by etching as shown in FIG. 7A. The photoresist layer 24 is applied on the roughened surface (FIG. 7B). Most of the ultraviolet light penetrating the photoresist 24 is reflected at the roughened surface, whereby the light entering the undesired portion of the photoresist 24 is negligible. The roughened surface presents an increase in contact area between the glass 21 and photoresist 24 so that the latter is firmly adhered to glass 21.

Figure 8A:
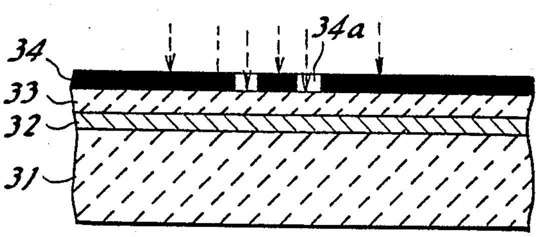
FIGS. 8A to 8F are illustrations of a second method for fabricating the rear nozzle plate.
Figure 8B:
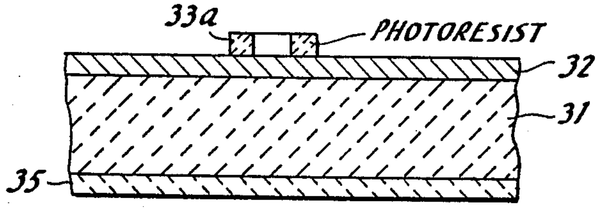
Figure 8C:
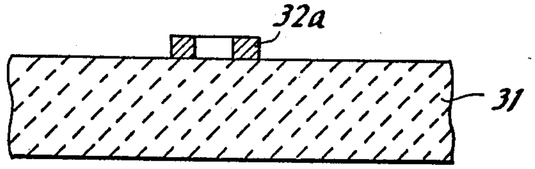

FIGS. 8A to 8F are illustrations of a second preferred method of fabricating the rear nozzle plate 7. In the first step, an insulative substrate 31 of ceramic or glass is prepared (FIG. 8A). On the substrate 31 is deposited a layer 32 of a material which is dissimilar to the underlying substrate. This material is chemically resistant to ink but can easily be eroded by an etchant. Suitable materials for the layer 32 are copper, aluminum, gold, platinum, chrome, molybdenum, photosensitive glass as mentioned previously, and photosensitive resin. Such metal is deposited by electroplating and the nonmetal material can be deposited using a suitable adhesive. A photoresist layer 33 is applied on the layer 32. The photoresist 33 is exposed to ultraviolt imagewise radiation through a photomask 34 having transparent portion 34a in the shape of a ring in the opaque background. The unexposed portions of the photoresist 33 are removed to create a photoresist ring 33a on the layer 32 as shown in FIG. 8B. An etching resistant coat 35 is applied on the lower surface of substrate 31. The substrate 31 is then immersed in an etching solution to remove the portions of the layer 32 which are unoccupied by the photoresist ring 33a. If the layer 32 is composed of gold or platinum, aqua regia can be used as the etching solution. The photoresist ring 33a is then removed by carbonizing it in a plasma followed by the removal of the etching resistant layer 35 to thereby form a nozzle 32a (FIG. 8C).

Figure 8D:
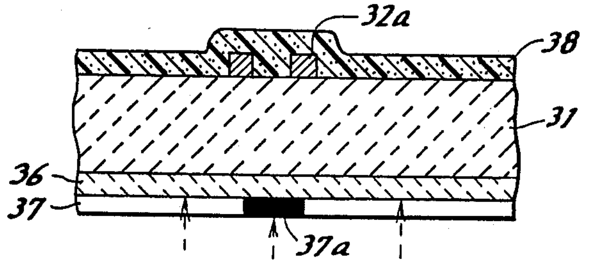
Figure 8E:
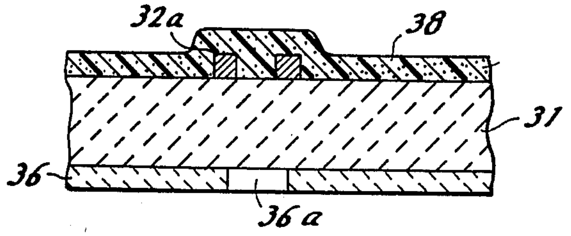
Figure 8F:
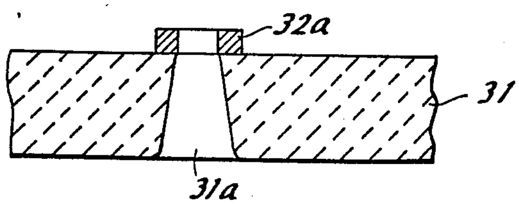

In FIG. 8D, photoresist is applied to the lower surface of substrate 31 to form a layer 36 which is flooded with an ultraviolet imagewise radiation through a photomask 37 having an opaque portion 37a masking the portion directly below the nozzle 32a in a manner similar to the step shown in FIG. 5C. A hydrofluoric acid resistant layer 38 of the material as used in the layer 26, FIG. 5D, is applied entirely over the upper surface of substrate 31 so that the space within the nozzle 32*a* is filled (FIG. 8D), which is followed by the immersion of the substrate into a photoresist etching solution to remove the unexposed portion of photoresist layer 36 to form a hole 36*a* (FIG. 8E). The substrate is then immersed in an aqueous hydrofluoric acid solution to form a hole 31*a*, FIG. 8F, that extends through the thickness of substrate 31, followed by the removal of layers 36 and 38. The method of FIGS. 8A to 8F is advantageous for applications in which it is desired to select a suitable material for the projecting nozzle portion 32*a* having a sufficient surface roughness to retain the meniscus which may be different from the surface roughness of the substrate 31.

Figure 9A:
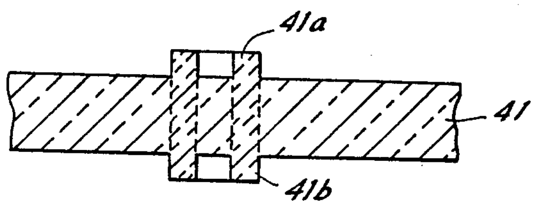
FIGS. 9A to 9F are illustrations of a third method for fabricating the rear nozzle plate.
Figure 9B:
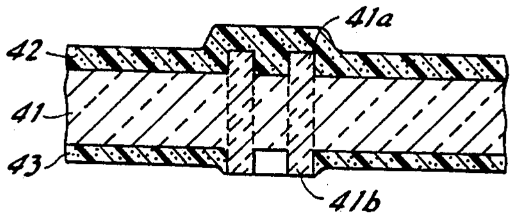
Figure 9C:
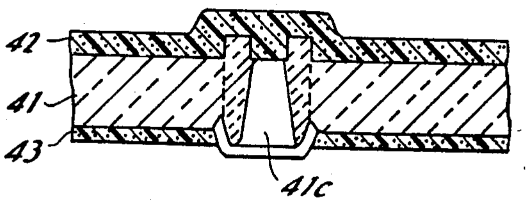

FIGS. 9A to 9F illustrate a further manufacturing process in which the steps of FIG. 5A is initially performed to crystallize portions of a glass substrate 41 that surround a cylindical amorphous portion. The step shown at FIG. 9A follows. This step is similar to the step of FIG. 5B with the exception that the etching process is carried out on opposite surfaces of the glass substrate 41 to form a pair of nozzles 41*a* and 41*b*. Since the upper nozzle 41*a* is produced out of the region which is located closer to the photomask than is the lower nozzle 41*b*, the former has a more sharply defined boundary with the surrounding area than the latter. In FIG. 9B, the upper surface of substrate 41 is entirely coated with a hydrofluoric acid resistant layer 42 so that it fills the space within the nozzle 41*a*. The lower surface is coated with a layer 43 over areas outside of the lower nozzle 41*b*. The layer 43 may be formed of the same wax as used in FIG. 5D. The lower nozzle portion 41*b* has a greater surface roughness on its side wall than on its upper face. The difference in surface roughness prevents the paraffin layer 43 from spreading beyond the upper edge of the nozzle portion 41*b*. The substrate is then immersed in an aqueous hydrofluoric acid solution of 5% concentration which is maintained at a temperature lower than 34° C. to create a hole 41*c* within the amorphous cylinder that extends between nozzles 41*a* and 41*b* (FIG. 9C). In this process, etching solution tends to permeate through the boundary between the nozzle 41*b* and surrounding layer 43 to cause erosion to occur along that boundary. The substrate can be etched for a period of 35 minutes at a solution temperature of 20° C. to remove a volume to a depth of 170 micrometers with a diameter of about 50 micrometers. Due to sideways erosion, the hole 41*c* is tapered upward.

Figure 9D:
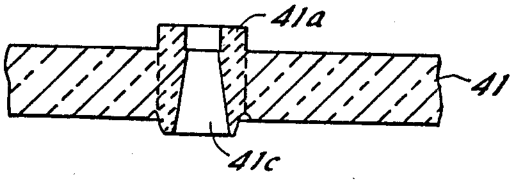
Figure 9E:
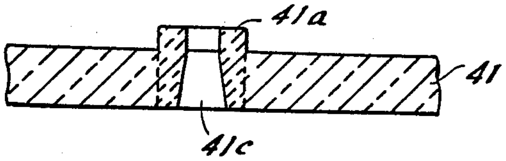
Figure 9F:
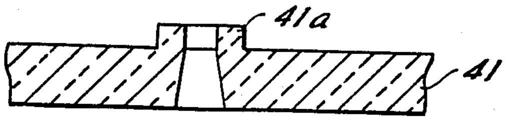

Layers 42 and 43 are removed in a solution of trichloroethylene agitated at ultrasonic frequency (FIG. 9D). The lower surface of the substrate is lapped to present a flat surface (FIG. 9E). The substrate 41 is then subject to ultraviolet radiation and then heated in the same manner as in FIG. 5G to crystallize the amorphous region (FIG. 9F).

The hydrofluoric acid resistant layer 43 may alternatively be formed of epoxy resin adhesive which is a mixture of Epicoat 828 as a principal component and Epicure Z as a curing agent (both being the trademarks of Shell Chemicals). The photosensitive glass substrate 41 is heated to a temperature of 40° C. to apply Epicoat 828 to a thickness of 5 micrometers and then allowed to half-cure for a period of 50 hours at room temperature to prevent intrusion of Epicoat into the nozzle 41*b*. This is followed by a full curing process in which the substrate is maintained at a temperature of 70° C. for a period of 60 minutes. The epoxy resin layer 43 can be removed in an oxygen plasma environment. In comparison with the method involving the use of the wax, the epoxy resin layer 43 is favored in terms of its excellent adherence to the underlying glass substrate and strength. Due to the high strength, undesired erosion around the nozzle 41*b* can be minimized.

In the process of FIGS. 9A to 9F just described, the ultraviolet imagewise radiation process is performed only on one surface of the photosensitive glass substrate, whereas in the previous methods the radiation process is performed on opposite sides of a substrate. The process of FIGS. 9A to 9E eliminates misregistration which might occur between the two photomasks used on opposite sides of the substrate.

Figure 10:
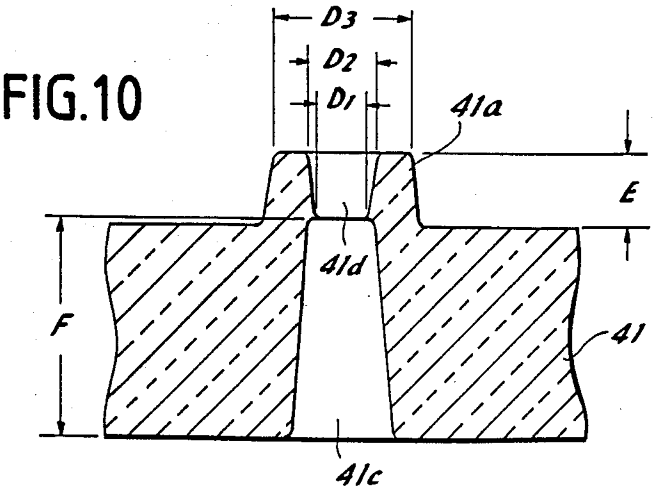
FIG. 10 is a cross-sectional view of a rear nozzle plate manufactured according to the present invention.

As seen in FIG. 10, typical dimensions of a rear nozzle manufactured according to FIGS. 9A to 9E measure F=170 μm, E=30 μm, D1=45 μm, D2=50 μm and D3=90 μm. Due to the single imagewise radiation, the nozzle opening 41*c* is precisely aligned with the nozzle opening 41*d* in the nozzle 41*a*.

Since the first etching process involved in forming the rear nozzle openings on one surface of the substrate is performed in a much smaller period of time than is taken to perform the second etching process on the opposite side and since dimensional variations between different nozzles increase as a function of time taken to perform the etching process, the method of the present invention ensures quantity manufacture of nozzle plates with a precisely dimensioned nozzle opening. Furthermore, the second etching process can be effected for a desired length of time to take advantage of the sideway etching tendency of the photosensitive glass substrate so that the transverse cross-section of the rear hole 41*c* can be made greater than that of the nozzle opening 41*d* to reduce its flow resistance to liquid.

It is found that the configuration of the ink meniscus on the projecting nozzle 8 is affected by the electric field distribution, the viscosity of the ink of typically oily material, the transient pressure variations in the projecting nozzle 8 and in the air chamber 10 and the size of the meniscus which is affected by the voltages applied to the electrodes. As a result, the ink tends to be deflected out of the intended trajectory as it is discharged from the projecting nozzle 8. This results in a buildup of an ink layer on the walls adjacent to the projecting nozzle 8. Since the ink is conductive, the electric field will be seriously deformed to worsen the out-of-the-path deflection problem.

It is therefore preferable that portions of the adjacent walls where the ink particles are likely to hit be rendered ink-repellant. Since the tendency of a material to become wet depends on the roughness of its surface, it is effective to polish a portion 2*a* of the front nozzle plate 2 surrounding the front channel 3 to a mirror-finish.

Figure 11C:
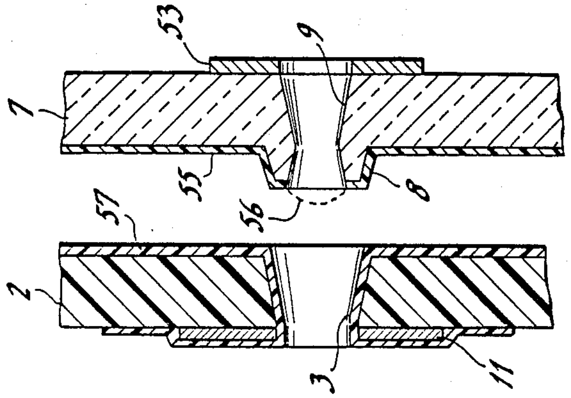
FIGS. 11A to 11C are cross-sectional views of embodiments in which ink-repellant layers are formed on the nozzle members.
Figure 11B:
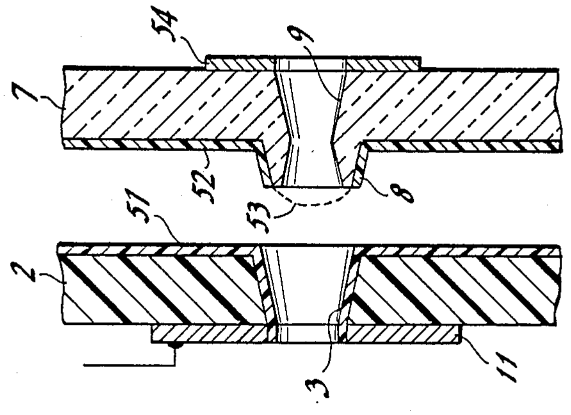
Figure 11A:
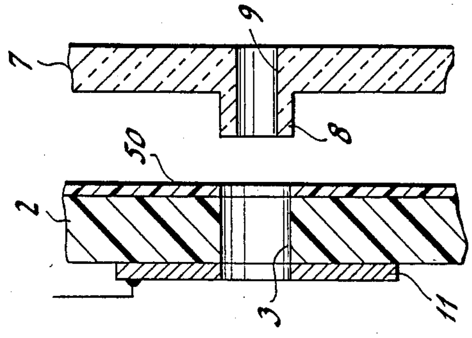

FIGS. 11A to 11C are illustrations of preferred embodiments for eliminating the deflection problem. In FIG. 11A, the inner surface of the front nozzle plate 2 is coated with a thin layer 50 of an ink-repellant material (which is also oil-repellant) such as ethylene tetrafluoride resin which is typically available as Teflon, a trademark of Du Pont, or a fluoride-containing polymer available as a mixture of liquids known under the trademark Fluorad FC-721 and FC-77 of 3M Corporation. Due to the reduced wetness, any amount of ink deposited on layer 50 is expelled to the outside by the air passing over the surface of the layer 50.

In FIG. 11B, the fluoride-containing polymer liquid mentioned above is sprayed on the inner surface of the front nozzle member 2 so that an ink-repellant layer 51 is formed on the inner wall of a forwardly tapered front channel 3 as well as on the inner surface of the member 2. Since Fluorad has a surface tension of 11 to 12 dynes/cm, a satisfactory level of repulsiveness can be obtained. On the surface of the rear nozzle member 7 is preferably deposited an ink-repellant layer 52 formed of a mixture of fluoride-containing diamine and epoxy resin. Specifically, after forming a coat, the mixture is cured by heating it at 150° C. for 1 to 5 hours. The same level of repulsiveness as ethylene tetrafluoride can be obtained. Since the outer wall of the projecting nozzle 8 and the area surrounding the foot of the nozzle 8 have a surface roughness greater than that of the front end of the projecting nozzle 8 due to the etching process mentioned previously, the repellant layer 52 can be easily formed excepting the front end of the nozzle. In the emodiment of FIG. 11B, the ink tends to extend to the perimetry of the front end face of the projecting nozzle 8 due to the low wet contact angle with glass with which it is formed. Therefore, a relatively large meniscus 53 will thus be formed. An electrode 54 may be provided on the rear surface of the rear nozzle member 7.

An ink-repellant layer 55 may also be formed on the front end face of the projecting nozzle 8 as shown in FIG. 11C. This layer is formed by spraying the fluoride-containing polymer liquid mentioned above. Due to repelling action, the ink is confined within the inner perimetry of the coat on the front end face, a relatively small meniscus 56 will be formed. Because of an increased field concentration on the meniscus 56 a lower threshold voltage is required for dischaging the ink through nozzle 8 than is required with the previous embodiment. Front nozzle member 2 is preferably coated with an ink-repellant layer 57 which extends outwardly to enclose the electrode 11. The front-wall coating is to repel the ink particles which might return to the front member 2 by turbulence caused by the air ejected at high speeds from the channel 3.

Ink-repellant materials that can be advantageously employed in the present invention include:

(a) fluoride-containing polymer such as polytetrafluoroethylene, fluorinated ethylene-propylene copolymer, polychlorotrifluoroethylene, polyvinylfluoride, tetrafluoroethylene perfluoroalkylvinylether copolymer, polyvinylidene fluoride, ethylene-tetrafluoroethylene copolymer, ethylene-chlorotrifluoroethylene copolymer, epoxy resin mixed with fluoride-containing diamine, or fluoride-containing alkyl silane;

(b) inorganic fluoride-containing compound such as calcium fluoride and graphite fluoride;

(3) silicone polymer of the type which is composed of a Si-O bond and is capable of being cured at room temperatures or silicone polymer of the type which is cured at elevated temperatures; and (4) a copolymer of fluoride-containing polymer and silicone polymer such as:

$$F-\underset{F}{\overset{F}{C}}-CF_2-CF_2 \quad CF_2-Si(OCH_3)_3$$

Figure 12B:
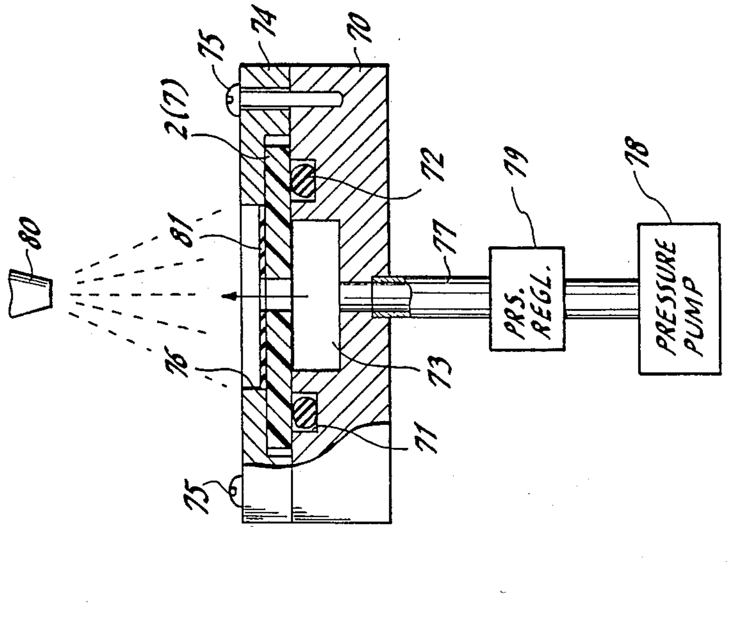
FIGS. 12A and 12B are illustrations of apparatus for depositing an ink-repellant layer on a nozzle member.
Figure 12A:
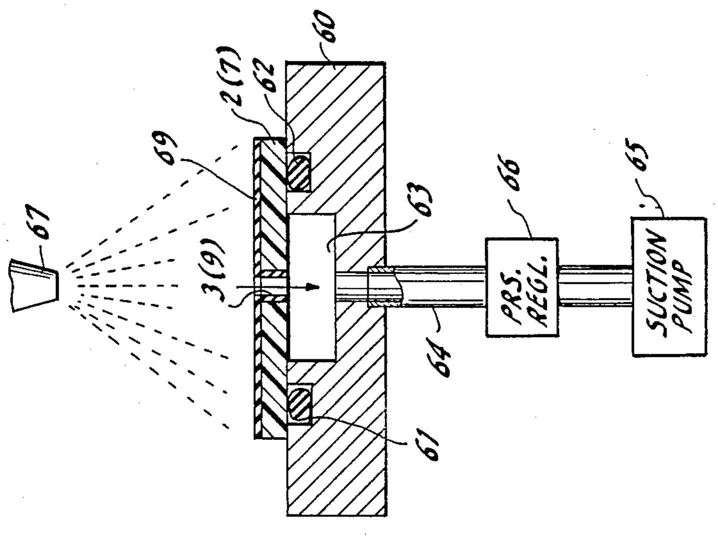

Ink-repellant material is successfully deposited on the front and rear nozzle plates by means of apparatus shown in FIGS. 12A and 12B.

In FIG. 12A, a mount 60 includes an annular groove 61 on the upper surface in which a seal 62 is fitted. Mount 60 is formed with a negative pressure chamber 63 which communicates through a pipe 64 to a suction pump 65. Nozzle member 2 or 7 is placed on the mount 60. Seal 62 provides an air-tight sealing contact to allow air to be admitted into the chamber 63 exclusively through the channel 3 (or 9). The speed of the air passing through the channel is controlled by a pressure regulator 66 located in the pipe 64. Ink-repellant material is sprayed by a spray gun 67 to the nozzle member to form an ink-repellant layer 69 thereon. Due to the air flowing in the same direction as the direction of movement of the sprayed particles, the latter is carried by the air and forms a thin film on the inner wall of the channel. Otherwise, the sprayed material would clog the channel.

Apparatus shown in FIG. 12B is useful for forming the ink-repellant layer only on the surface portion of the nozzle member. A mount 70 has an annular groove 71 in which is provided a seal 72 and a positive pressure chamber 73. A holding member 74 is detachably secured to the mount 70 by screws 75 to hold the nozzle plate in between. Holding member 74 is formed with a window 76. Chamber 73 is connected by a pipe 77 to a pressure pump 78 to produce a positive pressure in the chamber 73 and eject air to the outside through the channel of the nozzle member, the speed of airflow in the channel being controlled by a pressure regulator 79. Ink-repellant material is sprayed by a spray gun 80 to form an ink-repellant layer 81 within the window 76. Since the direction of movement of air through the channel is opposite to the direction of movement of the sprayed material, the latter is deposited only on the surface portion of the nozzle plate and is prevented from clogging the channel.

What is claimed is:

1. An ink jet printer comprising:

a source of pressurized air;

a liquid container;

an ink jet print head comprising a front nozzle member having a front channel, a housing secured to said front nozzle member, a rear nozzle member defining with said housing a liquid chamber connected to said container and defining with said front nozzle member a laminar airflow chamber, the rear nozzle member having a forwardly projecting nozzle and a rear channel extending from the liquid chamber in axial alignment with said front channel, said front and rear nozzle members being respectively formed of a flat panel and arranged in face-to-face relationship with each other, and said forwardly projecting nozzle being in the shape of a ring projecting from the flat-panel rear nozzle member as an extension of said rear channel for forming a meniscus at a forward end of said extension, said ring-shaped projection substantially corresponding in radial dimensions to said front channel, said airflow chamber being connected to said air source for directing air to a point between said front and rear channels so that it makes a sharp turn at the entry into said front channel creating a sharp pressure gradient along a path between forward ends of said front and rear channels and creating a dead air region surrounding said meniscus as a result of the sharp pressure gradient;

means including an electrode adjacent the forward end of said front channel for establishing an electric field gradient between said front channel and said meniscus to cause the meniscus to be partially expelled through said front channel;

means connecting said liquid container to said air source so that in the absence of said electric field gradient the liquid pressure in said rear channel is statically balanced with the combined forces of said air pressure acting on said meniscus and the surface tension of the liquid;

a first liquid repellant layer covering forward and rear end portions of said front channel and inner walls of said front channel; and a second liquid repellant layer covering front end and outer walls of said ring-shaped projection.

* * * * *